Nov. 22, 1966  H. L. BOPPEL  3,286,410
FORMING METHOD AND APPARATUS
Filed June 1, 1964
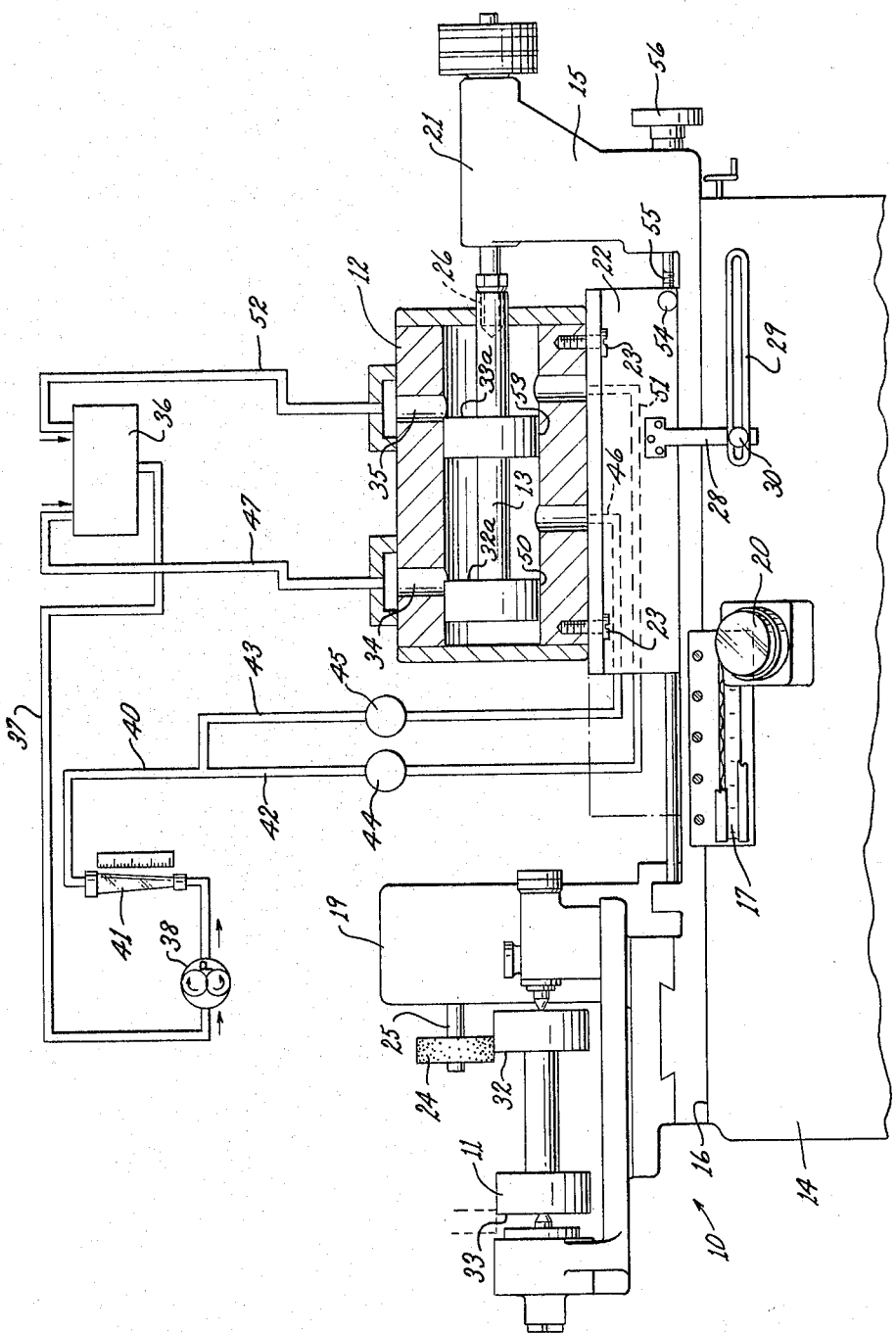
INVENTOR.
HENRY L. BOPPEL
BY Ernest J. Hix
HIS ATTORNEY United States Patent Office 3,286,410
Patented Nov. 22, 1966

3,286,410
FORMING METHOD AND APPARATUS
Henry L. Boppel, Dayton, Ohio, assignor to The Sheffield Corporation, Dayton, Ohio, a corporation of Ohio
Filed June 1, 1964, Ser. No. 371,524
8 Claims. (Cl. 51—165)

This invention pertains to an apparatus and method for forming articles and more particularly to an apparatus and method for forming cooperating flow controlling components used in fluid systems.

Current machines and methods used in producing flow controlling cooperating elements such as pistons and cylinders used in fluid systems to properly correlate the cooperating flow controlling piston lands and cylinder ports are quite complex requiring that control dimensions be measured by skilled operators using precision equipment. Obviously these techniques are subject to limitations of the measuring equipment as well as operator error. Even those machines and methods in current use which employ optical equipment to align control surfaces of one part with corresponding control surfaces of another part to enable the forming of a corresponding cooperating surface on the other part required a skilled operator to physically align the parts. Furthermore, once the parts are assembled in an operating environment it is not certain that they will perform to the required standard.

Accordingly an object of this invention is the provision of an improved apparatus and method for forming components used in fluid systems as a function of desired fluid performance conditions.

Another object of this invention is the provision of a apparatus and method for forming fluid system components simply and without the need for highly skilled operators and complicated precision equipment.

Another object of this invention is the provision of apparatus for forming the first of a cooperating pair of first and second flow controlling components to be assembled together by reference to desired flow conditions obtained with said second component and a reference first component cooperating together in flow control relationship in an operating fluid environment.

Another object of this invention is the provisio of a method for forming one of a cooperating pair of components to obtain desired flow conditions from said pair when placed in assembled relation in an operating fluid environment, by using a reference unit corresponding to said one component and placing it in cooperating flow relationship in an operating fluid environment with a formed other component of the pair, and using the resultant flow parameters from said flow relationship to determine the forming of said one component.

Another object of the invention is the provision of a machine for grinding flow controlling edges of lands on a first piston for assembly in a cooperating formed cylinder which has fluid ports therein, by reference to the displacement necessary between the formed cylinder and a reference piston, assembled in an operating fluid environment, from a first relative position in which a first desired flow condition is obtained through cooperation of a first land and port to a second reference position in which a second desired flow condition is obtained through cooperation of a second land and port, and using said displacement as the determining factor in grinding corresponding first and second lands on said first piston such that each land on said first piston is flow matched with a corresponding port in said cylinder when said cylinder and first piston are placed in assembled relation.

Other objects and advantages of the invention will be apparent from the following description, the appended claims, and the accompanying drawing, which illustrates a front view of an exemplary embodiment of the invention showing the fluid system schematically and with the pistons and housing drawn to an enlarged scale.

In the exemplary embodiment of the invention a machine 10 is illustrated for forming a first component or first piston 11 for cooperating assembly in a second formed cooperating component or housing 12. The machine and method for forming enables such piston to be formed so that the desired flow conditions will be obtained between it and housing 12 when the two are placed together in an operating fluid environment.

Because it is impossible to machine piston 11 while it is assembled in its cooperating housing 12 this invention provides for use of a reference first component or first piston 13, hereinafter referred to as master 13, in cooperating fluid relationship with housing 12. The diameter of piston 11 is the same, within acceptable tolerance limits, as master 13. In this exemplary embodiment, land edges are formed on piston 11 by reference to movements necessary between a corresponding master piston 13 and a housing 12 (with which piston 11 is to be assembled) to obtain desired flow conditions with master 13 and housing 12 assembled in an operating fluid environment. Master 13 is a nominal configuration. If housing 12 were also of nominal configuration the land displacement on piston 11 would be known. However, in the present invention, through functioning comparison, land edges on piston 11 are formed with relative spacing modified from nominal as necessary to accommodate variations in housing 12 which unavoidably occurs in manufacture. This insures that piston 11 and housing 12 when assembled will provide the same desired flow conditions. Spacing of lands on piston 11 are thus determined solely by performance considerations with no concern for actual physical dimensions involved. Forming such components through dimensional techniques or through matching outside an operating fluid environment do not insure optimum performance. To provide a better understanding of the invention, pistons 11 and 13 and housing 12 are shown in enlarged proportion with respect to machine 10, and for simplicity the hydraulic system is shown schematically.

The machine 10 includes a base 14 on which is mounted carriage means such as a carrier or carriage 15 for movement back and forth on a supporting surface 16 on said base. A scale 17 attached to the carriage 15 cooperates with a precision indicator 20 fixed to the base and indicates the position of the carriage with respect to the base. This scale and indicator are preferably used to obtain a movement through a basic dimension (as later discussed) through which piston 11 is displaced relative to the forming means.

A support 21 provided for master 13 is mounted for movement on said base. In the exemplary embodiment of the invention the support forms a part of carriage 15 and includes threaded connection 26 for detachably mounting master 13 to carriage 15 for movement therewith.

Support means such as a support 22 for housing 12 is adjustably mounted on said base through carriage 15 in this example. Support 22 includes means such as bolts 23 for fastening housing 12 to support 22. Suitable fluid seals are provided between support 22 and housing 12 as well as at all plumbing connections to housing 12.

Piston 11 is formed using forming means such as a grinding wheel 24 rotatably mounted on a shaft 25 supported by an upright carrier member 19 which is adjustable on the base 14 in the direction of movement of carriage 15 but is normally fastened or locked in a known manner to base 14 during grinding. Grinding wheel 24 and member 19 may be adjusted on the base to compensate for wheel wear as will be subsequently discussed.

Support 22 has an arm 28 fixed thereto which extends in cooperative association with a slotted member 29 in the base 14. A knob 30 threaded into arm 28 is provided for locking arm 28 and hence support 22 at positions along member 29, and hence along the base irrespective of movements of carriage 15. Locking carrier member 19 and support 22 to the base connects these members into a first interconnected assembly. For purposes as later described support 22 can be freed from base 14 and fixed to carriage 15 through conventional lock 54, and adjusted thereon through hand wheel 56 and thread 55. Carrier 18 mounted on carriage 15 is provided for piston 11 while support 21 and threaded connection 26 fastens master 13 to said carriage 15 to thus form a second interconnected assembly. Carrier 18 is movable in a direction transverse the direction of movement of carriage 15 to enable the grinding of flow controlling surfaces on piston 11. With this arrangement it will be apparent that equal movement of master 13, to the left and right in the drawing for example, provides movement of piston 11 in the same sense and of the same magnitude with respect to grinding wheel 24 as master 13 with respect to housing 12 and connected support 22.

While the various supports and carriages for wheel 24, piston 11, master 13 and housing 12 have been shown and described as interconnected in a certain relationship during critical positioning, it is only essential during this positioning that a first of the fluid controlling components be interconnected with either the forming means in piston 11 and the second fluid controlling component be interconnected with the other.

The significance of this structure will be apparent even without a detailed description of the hydraulic system, which will follow, in that with a desired flow condition established between master 13 and housing 12, piston 11 is positioned at a reference position for forming a corresponding flow controlling surface 32 thereon. Then carriage 15, with piston 11, housing 12, and master 13 fixed thereto is displaced the previously mentioned basic dimension. This is achieved to bring the proper land in preliminary position with respect to the grinding surface of wheel 24. Then to compensate for any deviations between master 13 and housing 12 these two components are relatively displaced through movement of carriage 15 with support 22 clamped to base 14 to obtain a second reference flow condition. Piston 11 is thus displaced a corresponding amount to a corrected position taking into account variations in housing 12 to enable forming a second flow controlling surface 33 thereon.

Housing 12 and piston 11 are then assembled together such that flow controlling surfaces 32 and 33 thereof are placed in cooperating relationship with ports 34 and 35 respectively of housing 12.

The operating fluid environment used to enable forming piston 11 to the desired fluid or flow condition is illustrated using hydraulic oil which is contained in a reservoir 36. The oil is pumped from reservoir 36 through a conduit 37 by a pump 38 and thence through a conduit 40 having a flowmeter 41 therein for indicating the amount of oil flow therethrough and the desired flow conditions when obtained.

Conduits 42 and 43 are connected to conduit 40 downstream of flowmeter 41. Each conduit 42 and 43 has a normally closed shutoff valve 44 and 45 respectively installed therein for controlling oil flow to housing 12 as required during operation of the system. During measurement of flow through port 34 of housing 12, valve 45 is opened and oil flows through conduit 43 and into a passage 46 in slide 22 and in turn through port 34 in housing 12. Oil exiting housing 12 from port 34 is returned to reservoir 36 through a line 47 connected to port 34. The amount of oil flow is measured by flowmeter 41 and is controlled by flow controlling land 50 of master 13 terminated by surface 32a and by the position of surface 32a relative to port 34 in formed housing 12.

During measurement of flow through port 35 of housing 12, valve 44 is opened and oil flows through conduit 42 and into a passage 51 in slide 22 and in turn through port 35 in housing 12. Oil exiting housing 12 through port 35 is returned to reservoir 36 through a line 52 connected to port 35. Again flowmeter 41 measures the amount of flow which in this instance is controlled by flow controlling land 53 of master 13 terminated by surface 33a and by the position of surface 33a relative to port 35 in housing 12.

Thus it is seen that a complete fluid system is provided which uses flowmeter 41 to sense the conditions of the fluid environment between master 13 and housing 12 and in this exemplary embodiment indicates the amount of flow through either port 34 or 35 of housing 12 controlled by the position of surfaces 32a and 33a respectively relative to such ports.

In actual operation a piston 11 to be formed is mounted on slide 18 which as previously described is movable transverse to the direction of movement of carriage 15 and toward and away from grinding wheel 24. Housing 12 is mounted on support 22 which is preferably adjustably mounted on carriage 15 and a master 13 is mounted on carriage 15 in flow relationship with housing 12 in an operating fluid environment. Housing 12 and support 22 are adjustably positioned on carriage 15 by turning knob 54 which brings threaded shaft 55 into threaded engagement with support 22. Then by turning handwheel 56 support 22 is adjusted and held in threaded engagement on carriage 15. This adjustment positions housing 12 with respect to master 13 at a first relative position at which position threaded shaft 55 serves as the first lock means for locking support 22 on carriage 15. The first relative position is determined by the desired flow condition obtained through cooperation of land edge 32a and port 34 at which position the carriage is locked to the base by a handwheel 57 at what will be referred to as a first reference position with the corresponding land edge 32 of piston 11 positioned for grinding. Slide 18 is then moved toward and away from grinding wheel 24 to form surface 32 thereon corresponding to surface 32a on master 13. After such forming the carriage is unlocked from the base.

Carriage 15, carrying piston 11, master 13, and housing 12 is now moved the basic dimension relative to grinding wheel 24. This dimension is determined accurately by observing indicator 20. While it is not mandatory that piston 11 be relatively moved the basic dimension with respect to grinding wheel 24 at this point in the operating sequence, it has been so moved to simplify the presentation. Support 22 is then locked to base 14 by tightening knob 30 as previously described while simultaneously releasing support 22 from carriage 15 by loosening knob 54 to enable free movement of the carriage. With support 22 and hence housing 12 thus locked to the base, carriage 15, now free from support 22, is moved until surface 33a of master 13 is placed in a desired flow control relationship with port 35 of housing 12. At this point it will be apparent that master 13 and piston 11 both being fastened to carriage 15 have moved an equal and simultaneous distance to compensate for variations between housing 12 and master 13 and thus assures that once piston 11 is ground and properly assembled in housing 12 it will be flow matched with housing 12 to give desired flow performance. With the proper flow relationship thus established carriage 15 is locked to base 14 by tightening handwheel 57 and slide 18 is moved toward and away from grinding wheel 24 to form a flow controlling surface 33, corresponding to surface 33a on piston 11.

It is apparent that the flow controlling surfaces 32 and 33 have been matched to take into account deviations in configuration of housing 12, such that when piston 11 and housing 12 are assembled together as previously discussed and placed in an operating fluid environment only the desired flow will be obtained through ports 34 and 35 through respective cooperation with flow controlling surfaces 32 and 33, and errors which normally would have been present if the components had been formed and matched in any other known manner will have been avoided.

The basic dimension, referred to above, involved in the first movement after land edge 32 has been ground must take into account known nominal spacing and nominal stroke of master reference components. For example, if the first movement in the illustrated embodiment equalled the nominal spacing of lands on master 13 less the nominal stroke of master 13 between desired flow conditions, then the second movement in the same direction with support 22 locked in position will be that nominal stroke as modified by the variation from nominal in the spacing between ports 34 and 35—thus this variation is reflected in the spacing of land edges 32 and 33 ground on piston 11. Because in production forming the basic dimension will be repetitively used a plug or end standard of that length can be positioned between stops to determine the necessary displacement in each instance in lieu of scale 17 and indicator 20.

Means are provided to assure that wear of grinding wheel 24 will not adversely effect the grinding of piston 11 and its cooperating assembly in housing 12. This may include conventional gaging elements; or it may include a precision microscope fixed on the base so its line of sight is on the grinding edge of wheel 24. As the wheel wears, upright member 19 is adjusted on the base to compensate for such wear and locked at a new fixed position to thus maintain a first relative position.

Obviously the method of this invention employing functional comparison can be carried out by precisely measuring the displacement of master 13 within formed housing 12 while in an operating fluid environment between desired reference flow conditions; and then using this displacement, which reflects deviations in port spacing from nominal, to determine the necessary measured displacement between grinding wheel 24 and piston 11 as the operating lands are ground so that these lands also reflect this functionally determined deviation.

Thus it is seen that an apparatus and method are provided which make possible production of flow controlling components in a simple, efficient and economical manner. Furthermore, the method and apparatus enables forming of a first flow controlling component by reference to flow conditions obtained by a reference first component in flow controlling association with a formed second component such that when said first and second components are assembled together they will be flow matched.

While the method and form of apparatus herein described constitute preferred embodiments of the invention, it is to be understood that the invention is not limited to this precise method or form of apparatus and that changes may be made therein without departing from the scope of the invention which is defined in the appended claims.

What is claimed is:

1. A machine for forming the first of a cooperating pair of first and second flow controlling components by reference to desired flow conditions obtained through cooperation of a formed second component with a reference first component while cooperating together in an operating fluid environment comprising, a base,
carriage means mounted on said base for movement therealong,
forming means on said base,
support means adjustably mounted on said base,
means for detachably mounting a reference first component to said carriage means for movement therewith,
means for mounting a second formed cooperating component on said support means and in flow relation with said reference first component,
means for placing said reference first and said second component in an operating fluid environment,
means for sensing the conditions of said fluid environment,
means for adjustably mounting said first cooperating component on said base,
and means for relatively moving said first component and said forming means from a first forming position to a second through a basic relative movement of given amount and in a sense modified in each instance as determined by the necessary relative movement between said second component and said reference first component from a first desired flow condition to a second as indicated by said sensing means controlled by said reference first and said second component, whereby said first and second cooperating components are flow matched for optimum performance when placed in assembled relation.

2. A machine for forming the first of a cooperating pair of first and second flow controlling components by reference to desired flow conditions obtained through cooperation of a formed second component with a reference first component while cooperating together in an operating fluid environment comprising, a base,
forming means,
a carrier for said forming means mounted for movement on said base,
a carrier for a first component mounted for movement on said base,
a support for a reference first component mounted for movement on said base,
a support for a second component mounted for movement on said base,
means for placing said reference first and said second component in an operating fluid environment, means for sensing the conditions of said operating fluid environment, said supports being relatively positionable to bring said reference first component and said formed second component in cooperating flow relationship to obtain a first reference flow condition at which condition a first flow controlling surface is formed on said first component with said forming means and said first component in a first forming relationship and then relatively position said first component and said forming means through a basic relative movement of given amount and in a given sense,
means for interconnecting one carrier with one support and the other carrier with the other support into first and second interconnected assemblies,
and means for relatively positioning said first and second assemblies through a displacement and thus modify said basic relative movement in each instance by the movement necessary to obtain a second reference flow condition to thus enable forming a second flow controlling surface on said first component displaced from said first surface by said displacement, whereby flow controlling surfaces are formed on said first component relatively displaced in accordance with the displacement between corresponding surfaces on said reference first component as modified by variations introduced by said second component and said first and second cooperating components are flow matched for optimum performance when placed in assembled relation.

3. A machine for forming the first of a cooperating pair of first and second flow controlling components by reference to desired flow conditions obtained through cooperation of a formed second component with a reference first component while cooperating together in an operating fluid environment comprising,
  a base,
  forming means on said base,
  carriage means mounted on said base for movement therealong including means for detachably mounting a reference first component thereto,
  means for detachably mounting the first of said cooperating components on said carriage means for movement therewith and for forming association with said forming means,
  support means adjustably mounted on said base including means for detachably mounting a formed second cooperating component thereon in flow relation with said reference first component,
  means for placing said reference first component and said second component in an operating fluid environment,
  flow sensing means for sensing flow conditions between said reference first component and said second component,
  first lock means for locking said support means and said carriage means together at a first relative position with said reference first component and said second component in a first desired flow relation determined by a first flow controlling surface on said reference first component,
  means for moving said carriage means with said support means so locked thereto to enable forming a corresponding first flow controlling surface on said first component with said reference first component and said second component locked in said first flow relation and with said first component at a reference position relative to said base,
  and second lock means for locking said support means to said base free of said carriage to fix said second component relative to said base with said first component positioned relative to said forming means through a basic relative movement of given amount and in a given sense, whereby through further positioning of said carriage means a second desired flow condition is obtained through cooperation of a second flow controlling surface on said reference first component with said second component to thus position said first component along said base and thus modify said basic relative movement in each instance for forming of a second flow controlling surface thereon and whereby said first component is flow matched for assembly with said second component.

4. A machine for forming flow controlling surfaces on a first piston for assembly in a cooperating formed housing by reference to desired flow conditions obtained through cooperation of the formed housing with a reference first piston while cooperating together in an operating fluid environment comprising,
  a base,
  grinding means on said base,
  carriage means mounted on said base for movement therealong including means for detachably mounting a reference first piston thereto,
  means for detachably mounting said first piston on said carriage means for movement therewith and for forming association with said grinding means,
  support means adjustably mounted on said base for movement in the same direction as said carriage means including means for detachably mounting a formed housing thereon in flow relation with said reference first piston,
  means mounting said grinding means on said base for grinding movement transverse the direction of movement of said carriage and support means,
  means for placing said reference first piston and said housing in an operating fluid environment,
  flow sensing means for sensing flow conditions between said reference piston and said housing,
  first lock means for locking said support means and said carriage means together at a first relative position with said reference first piston and said housing in a first desired flow relation determined by a first flow controlling surface on said reference first piston,
  means for moving said carriage means with said support means locked thereto to enable forming a corresponding first flow controlling surface on said first piston with said reference first piston and said housing locked in said first flow relation and with said first piston at a reference position relative to said base,
  and second lock means for locking said support means to said base free of said carriage means to fix said housing relative to said base with said first piston positioned relative to said grinding means through a basic relative movement of given amount and in a given sense, whereby through further positioning of said carriage means a second desired flow condition is obtained through cooperation of a second flow controlling surface on said reference first piston with said housing to thus position said first piston along said base and thus modify said basic relative movement in each instance for forming of a second flow controlling surface thereon and whereby said first piston is flow matched for assembly with said housing.

5. A machine for forming flow controlling lands on a first piston for assembly in a cooperating formed cylinder having fluid ports therein by reference to desired flow conditions obtained through cooperation of the ports of the formed cylinder with the lands of a reference first piston while cooperating together in an operating fluid environment comprising,
  a base,
  grinding means on said base,
  a carriage mounted on said base for movement therealong including means for detachably mounting a reference first piston thereto,
  means for detachably mounting said first piston on said carriage for movement therewith and for forming association with said grinding means,
  a support adjustably mounted on said carriage for movement therewith including means for detachably mounting the formed cylinder thereon in flow relation with said reference first piston,
  means mounting said grinding means on said base for grinding movement transverse the direction of movement of said carriage and support means,
  means for placing said reference first piston and said cylinder in an operating fluid environment,
  flow sensing means for sensing flow conditions between said reference piston and said cylinder,
  first lock means for locking said support on said carriage at a first relative position with said reference first piston and said cylinder to obtain a first desired flow relation through a first port of said cylinder as determined by a first flow controlling land on said reference first piston,
  means for moving said carriage and said support to enable forming a corresponding first flow controlling land on said first piston with said reference first piston and said cylinder locked to provide flow through said first port and with said first piston at a reference position relative to said base,
  and second lock means for locking said support to said base free of said carriage to fix said cylinder relative to said base with said first piston positioned relative to said grinding means through a basic relative movement of given amount and in a given sense, whereby through further positioning of said carriage with said first piston and reference first piston attached thereto a second desired flow condition is obtained through cooperation of a second land on said reference first piston with a second port of said cylinder and said first piston is correspondingly positioned along said base and thus modify said basic relative movement in each instance for forming of a second land thereon and each land on said first piston is thus flow matched with a corresponding port in said cylinder when said cylinder and first piston are placed in assembled relation.

6. A method for forming the first of a cooperating pair of first and second flow controlling components by reference to desired flow conditions obtained through cooperation of a formed second component with a reference first component comprising, relatively positioning the reference first component and formed second component in an operating fluid environment to obtain a first desired flow condition determined by a first flow controlling surface on said reference first component, relatively positioning a forming means and the first component to a first reference relative position and forming a corresponding first flow controlling surface thereon, relatively positioning said reference first component and said formed second component through a displacement from said relative position obtaining said first desired flow condition as necessary to obtain a second desired flow condition determined by a second flow controlling surface on said reference first component, and relatively positioning said forming means and said first component from said first reference relative position through a basic relative movement therefrom as modified in each instance by said displacement and forming a corresponding second flow controlling surface on said first component, whereby said first and second flow controlling components are functionally correlated for optimum performance when placed in assembled relation.

7. A method for forming the first of a cooperating pair of first and second flow controlling components by reference to desired flow conditions obtained through cooperation of a formed second component with a reference first component comprising, fastening the reference first component to the first component for positioning therewith, relatively positioning said reference first component and the formed second component in an operating fluid environment to obtain a first desired flow condition determined by a first flow controlling surface on said reference component, relatively positioning a forming means and said first component to a first forming position and forming a corresponding first flow controlling surface thereon, positioning said reference first component relative to said formed second component, with said first component and said reference first component relatively fastened, in a sense and through a displacement modifying a basic relative displacement between said first component and said forming means in each instance to the extent as necessary to obtain a second desired flow condition determined by a second flow controlling surface on said reference first component to thus relatively position said first component and said forming means from said first to a second forming position, and forming a corresponding second flow controlling surface on said first component at said second forming position, whereby said first component is formed to cooperate with said second component to desired performance conditions while compensating for physical variations in said second component.

8. A method for forming flow controlling lands of a first piston for assembly in a cooperating formed cylinder having fluid ports therein by reference to desired flow conditions obtained through cooperation of the cylinder with a reference first piston comprising, fastening the reference first piston to the first piston for positioning therewith, relatively positioning said reference first piston and the cylinder in an operating fluid environment to obtain a first desired flow condition through a first port in said cylinder as determined by a first flow controlling land on said reference first piston, relatively positioning grinding means and said first piston to a first grinding position and forming a corresponding first flow controlling land thereon, positioning in a given sense said formed cylinder relative to said reference first piston with said first piston locked to said reference first piston by a displacement modifying a basic relative displacement between said first piston and said grinding means in each instance to the extent as necessary to obtain a second desired flow condition through a second port of said cylinder determined by a second flow controlling land on said reference first piston to thus relatively position said first piston and said grinding means from said first to a second grinding position, and grinding a corresponding second flow controlling land on said first piston, whereby each land on said first piston is thus flow matched with a corresponding port in said cylinder when said cylinder and first piston are placed in assembled relation.

References Cited by the Examiner
UNITED STATES PATENTS

| | | | |
|---|---|---|---|
| 2,745,222 | 5/1956 | Charf et al. | 51—289 X |
| 2,925,692 | 2/1960 | Hitchner | 51—165 |

LESTER M. SWINGLE, *Primary Examiner.*